United States Patent
Heberlein et al.

(10) Patent No.: US 11,174,453 B2
(45) Date of Patent: Nov. 16, 2021

(54) FILAMENT FOR PRODUCING A WASHING OR CLEANING AGENT PRODUCT, WASHING OR CLEANING AGENT PRODUCT, METHOD FOR PRODUCING FILAMENTS AND WASHING OR CLEANING AGENT PRODUCT AND PRINTING TEMPLATE FOR THE WASHING OR CLEANING AGENT PRODUCT

(71) Applicant: Henkel AG & Co. KGaA, Duesseldorf (DE)

(72) Inventors: Walter Heberlein, Vienna (AT); Matthias Sunder, Duesseldorf (DE); Katja Gerhards, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 140 days.

(21) Appl. No.: 16/332,088

(22) PCT Filed: Sep. 7, 2017

(86) PCT No.: PCT/EP2017/072406
§ 371 (c)(1),
(2) Date: Mar. 11, 2019

(87) PCT Pub. No.: WO2018/046569
PCT Pub. Date: Mar. 15, 2018

(65) Prior Publication Data
US 2019/0203161 A1    Jul. 4, 2019

(30) Foreign Application Priority Data

Sep. 12, 2016    (DE) .................... 10 2016 217 303.0

(51) Int. Cl.
*B29C 64/118*    (2017.01)
*B33Y 10/00*    (2015.01)
(Continued)

(52) U.S. Cl.
CPC .......... *C11D 17/042* (2013.01); *B29C 64/118* (2017.08); *B33Y 10/00* (2014.12);
(Continued)

(58) Field of Classification Search
CPC ....... B29C 64/118; B33Y 10/00; B33Y 70/00; B33Y 80/00; B29K 2029/04; C11D 1/00;
(Continued)

(56) References Cited

U.S. PATENT DOCUMENTS 9,175,250 B2    11/2015  Sivik et al.
2012/0048769 A1*  3/2012  Sivik ................. B29C 43/22
                                          206/524.1
(Continued)

FOREIGN PATENT DOCUMENTS

CN    102971408 A    3/2013
EP    0728804 A1    8/1996
WO    2012003360 A2    1/2012

OTHER PUBLICATIONS

EPO, International Search Report issued in International Application No. PCT/EP20171072406, dated Nov. 24, 2017.
(Continued)

*Primary Examiner* — Brian P Mruk
(74) *Attorney, Agent, or Firm* — Lorenz & Kopf, LLP

(57) ABSTRACT

The present disclosure relates to a filament (1,13,24) for printing a washing or cleaning agent product (12,28,31), comprising a filament matrix and at least one washing or cleaning agent component bound in the filament matrix, the filament matrix is formed, at least essentially, by at least one water-soluble plastic and the at least one washing or cleaning agent component is received in the filament matrix.

15 Claims, 4 Drawing Sheets

(51) Int. Cl.
  *B33Y 70/00* (2020.01)
  *B33Y 80/00* (2015.01)
  *C11D 1/00* (2006.01)
  *C11D 3/37* (2006.01)
  *C11D 17/04* (2006.01)
  *C11D 11/00* (2006.01)
  *C11D 17/00* (2006.01)
  *B29K 29/00* (2006.01)

(52) U.S. Cl.
  CPC ............. *B33Y 70/00* (2014.12); *B33Y 80/00* (2014.12); *C11D 3/3753* (2013.01); *C11D 11/0082* (2013.01); *C11D 17/0073* (2013.01); *B29K 2029/04* (2013.01)

(58) Field of Classification Search
  CPC ..... C11D 3/37; C11D 3/3753; C11D 11/0082; C11D 17/042
  See application file for complete search history.

(56) References Cited

U.S. PATENT DOCUMENTS

| | | | | |
|---|---|---|---|---|
| 2012/0052037 | A1* | 3/2012 | Sivik | A61Q 19/00 424/70.11 |
| 2015/0159330 | A1* | 6/2015 | Weisman | D04H 1/4309 162/134 |
| 2015/0190967 | A1 | 7/2015 | Stava et al. | |
| 2015/0291921 | A1* | 10/2015 | Rives | B22F 1/007 425/130 |

OTHER PUBLICATIONS

Alhijjaj, M.; Belton, P.; Qi, S.: "An investigation into the use of polymer blends to improve the printability of and regulate drug release from pharmaceutical solid dispersions prepared via fused deposition modeling (FDM) 3D printing." European Journal of Pharmaceutics and Biopharmaceutics, Bd. 108, 2016, S. 111-125 [Online Feb. 9, 2016].

Melocchi, A.: "Hot-melt extruded filaments based on pharmaceutical grade polymers for 3D printing by fused deposition modeling." Int. J. Pharm, Bd. 509, 2016, Nr. 1-2, S. 255-263.

* cited by examiner

FILAMENT FOR PRODUCING A WASHING OR CLEANING AGENT PRODUCT, WASHING OR CLEANING AGENT PRODUCT, METHOD FOR PRODUCING FILAMENTS AND WASHING OR CLEANING AGENT PRODUCT AND PRINTING TEMPLATE FOR THE WASHING OR CLEANING AGENT PRODUCT

CROSS-REFERENCE TO RELATED APPLICATION

This application is a U.S. National-Stage entry under 35 U.S.C. § 371 based on International Application No. PCT/EP2017/072406, filed Sep. 7, 2017, which was published under PCT Article 21(2) and which claims priority to German Application No. 10 2016 217 303.0, filed Sep. 12, 2016, which are all hereby incorporated in their entirety by reference.

TECHNICAL FIELD

The present disclosure relates to a filament for printing a washing or cleaning agent product, to a method for producing a filament of this kind, to a method for producing a washing or cleaning agent product using a filament of this kind, to a print template for printing a washing or cleaning agent product using a filament and to a washing or cleaning agent product produced using a filament of this kind, a method of this kind and/or a print template of this kind.

BACKGROUND

Many different washing or cleaning agent products are available on the market. Many washing agent products of this kind are suitable for washing very different textiles which have very different stains. In addition, however, there is also a whole range of specific washing agent products which are provided especially for specific textiles such as wool, sports textiles or black textiles. Various additives such as softeners or fragrances are also known. All of these washing agent products are also available as a powder and as a liquid washing agent. In addition, a specific stain remover can be purchased for almost every kind of soiling imaginable. In both commercial and private environments, very different textiles having very different types of soiling can thus be washed in a suitable manner, although in some cases chemical cleaning is required. Liquid and solid cleaning agents can likewise be prepared for specific applications, e.g. for washing dishes. Different additives may also be used in cleaning agents.

Washing agent products of the type mentioned at the outset are used in particular as washing agents in an automatic washing method for cleaning textiles. In principle, however, automatic or hand cleaning of objects other than textiles may also be considered.

Washing methods, i.e. in particular methods for cleaning textiles, are generally exemplified in that substances that have a cleaning effect are applied to the item to be cleaned in one or more method steps and washed off after the contact time, or in that the item to be cleaned is treated with a washing agent product or at least one washing agent component, for instance in an aqueous solution. In washing methods of this kind, temperatures of up to about 95° C. or less, about 90° C. or less, about 60° C. or less, about 50° C. or less, about 40° C. or less, about 30° C. or less or about 20° C. or less are used in different embodiments as contemplated herein. This temperature information relates to the temperatures used in the washing steps. These embodiments apply likewise to cleaning agents, in particular cleaning agents for automatic dishwashers.

In order to have the optimum washing or cleaning agent products available for the upcoming washing or cleaning tasks, it is sometimes necessary to store many different washing or cleaning agent products. Since the products are sometimes provided in larger units, not only is this costly, but also a lot of space needs to be provided for storing the products. However, it cannot be excluded that there may be a particular type of laundry for which the optimum washing product or the optimum combination of washing products is not available for the cleaning of said laundry. An additional washing product then first needs to be purchased or it needs to be accepted that the laundry will be treated in a non-optimal manner.

In addition to the washing or cleaning agent products, various methods for producing the products by employing 3D printing are known. In 3D printing, three-dimensional workpieces are built up gradually, in particular layer-by-layer. The building-up is carried out in a computer-controlled manner from one or more liquid or solid materials according to predefined dimensions and shapes. The dimensions and shapes, and ultimately the three-dimensional shape of the product, is given by a printing plate position. The printing plate position is present as a file of a suitable file format, in which instructions for the 3D printer are contained as to where the material to be processed is to be printed or provided, for instance in terms of x, y and z coordinates. The print template can be generated directly from a CAD (computer aided design) system or be a current CAD file. 3D printers are a sub-class of additive, i.e. cumulative, constructive manufacturing devices. 3D printing is therefore also referred to as an additive manufacturing method.

In order to produce products in 3D printing from plastic materials, such as acrylonitrile butadiene styrene (ABS), polylactic acid (PLA), nylon or combinations thereof, a method known as fused deposition modeling (FDM) is known, which can also be referred to as fused filament fabrication (FFF). For printing, 3D printers use plastic wires or plastic threads (filaments) wound on spools. These filaments are connected to the extruder, which conveys the filaments continuously through a heating element, in which the filament is melted. The melted or at least softened filament travels on to the nozzle of the extruder, where the plastic material comes out. The nozzle is referred to as the print head of the 3D printer, by employing which the melted or viscous plastic material is applied to a substrate or to a previously printed part of the product to be produced. The plastic material of the filament then solidifies such that an additional plastic layer can be printed on the corresponding plastic layer, until the final form of the product is completed. The sum of the printed layers then forms the product, or the object produced by employing 3D printing. In contrast, plastic materials that are curable using UV radiation are produced by employing stereolithography or multi-jet modeling, while in particular selective laser sintering, selective laser melting or selective electron-beam melting are considered for powdered plastic materials or metals.

The filaments for 3D printing using the FDM method are typically extruded. For this purpose, the plastic material is placed into an extruder as a granulate, which extruder softens or melts the plastic material and presses said plastic material out of a nozzle substantially continuously as a strand. The strand is then drawn, as required, through an opening of a defined diameter, in order to thus be able to precisely specify the diameter of the filament. The filament is additionally drawn through a water bath or water is applied thereto in order to cool and solidify the filament. The filament is subsequently wound up. In this case, the filament can be removed from the extruder by rolling or by winding up the filament to form a coil.

3D printing is used in particular to produce prototypes, small batches or highly individualized products, since, in contrast to many conventional production methods, for example injection molding, specific tools do not need to be produced first. Producing the corresponding tools is specifically often very expensive and time-consuming.

The present disclosure therefore addresses the problem of designing and developing the method, the washing product, the filament and the print template in each case of the type mentioned at the outset such that fewer washing products need to be stored in order to be able to perform a wide range of washing tasks in an optimal manner.

BRIEF SUMMARY

This problem is solved in accordance with claim 1 by a filament for printing a washing or cleaning agent product, comprising a filament matrix and at least one washing or cleaning agent component incorporated in the filament matrix, the filament matrix being formed at least substantially by at least one water-soluble plastic material and the at least one washing or cleaning agent component being absorbed in the filament matrix.

The problem is further solved in accordance with claim 6 by a method for producing a filament according to one of claims 1 to 5, in which the at least one water-soluble plastic material and the at least one washing or cleaning agent component, in particular in the form of at least one granulate, are heated in an extruder, discharged from at least one nozzle of the extruder together in one strand as an extrudate and subsequently cooled.

The mentioned problem is additionally solved in accordance with claim 8 by a method for producing a washing or cleaning agent product using at least one filament according to one of claims 1 to 5, in which the at least one filament is used in a 3D printer as a material for producing a washing or cleaning agent product.

Moreover, the above-mentioned problem is solved in accordance with claim 11 by a print template for printing a washing or cleaning agent product using a filament according to one of claims 1 to 5, comprising information relating to the gradual application of at least one material to a three-dimensional washing or cleaning agent product.

Lastly, the problem mentioned at the outset is also solved in accordance with claim 12 by a washing or cleaning agent product produced using a filament according to one of claims 1 to 5, a method according to claims 8 to 10 and/or a print template according to claim 11.

The present disclosure has recognized that it is useful to produce a washing or cleaning agent product by employing 3D printing. This makes it possible to produce very individual and specific washing or cleaning agent products at very low costs, since the washing or cleaning agent products can be produced in very small amounts. In addition, the washing or cleaning agent product no longer needs to be produced in large industrial plants. Instead, the washing or cleaning agent product can be produced in a decentralized manner, i.e. in particular at the site of use or near the site of use. This saves transportation costs and also time required for transportation to the site of use. In this case, the washing or cleaning agent product is produced directly at the site of use. This is particularly useful for commercial use of washing or cleaning agent products. However, it may also be useful if the washing or cleaning agent product is printed and used for washing by the private end consumer. Alternatively or additionally, 3D printing may also be carried out in stores, for instance in a drugstore. Rather than taking a washing or cleaning agent product from the shelf, the washing or cleaning agent product can be printed as required on the customer's request in the desired quantity on a 3D printer belonging to the store. In this context, it is further advantageous if the 3D printing of the washing or cleaning agent product can be carried out by a simple method, in particular the fused deposition modeling (FDM) method. This is not only simple and cost-effective, but also does not require a particularly expensive 3D printer, and therefore said printer can be operated without particular expertise. The 3D printer can therefore be used by a private individual, sales personnel or a user of the washing or cleaning agent product on site or at a site near to where the printing of the washing or cleaning agent product is carried out.

The at least substantially residue-free use of the washing or cleaning agent product produced by employing 3D printing is achieved by using a water-soluble plastic material that forms the filament matrix of the filament. The plastic material can thus be used as a support matrix for the washing or cleaning agent component incorporated therein and can be dissolved in an at least substantially residue-free manner during washing, meaning that residue does not need to be disposed of separately. In this case, the filament matrix can be formed as required at least in part from a washing or cleaning agent product. The filament matrix can thus have a dual functionality. However, in principle, it is preferable if the at least one component of the filament matrix is consciously selected with regards to its suitability as a filament matrix, for absorbing the at least one washing or cleaning agent component, for homogeneously fixing the washing or cleaning agent component in the filament and/or with regards to water solubility.

"Water-soluble" in the context of the present disclosure basically means a solubility which allows an at least substantially residue-free dissolution during a wash cycle under normal constraints. In particular, however, this is understood to mean a solubility in distilled water, measured at about 25° C. and a pH of about 7.0, of at least about 0.1 g/l, preferably at least about 1 g/l, even more preferably at least about 10 g/l, most preferably at least about 100 g/l. In some embodiments, the components have a solubility of at least from about 0.1 to about 500 g/l, measured at about 25° C. The water-soluble substances preferably require less than about 30 minutes to dissolve.

To produce the corresponding filament, the at least one water-soluble plastic material and the at least one washing agent component can be heated together in an extruder and then ejected from at least one nozzle of the extruder together in one strand as an extrudate. The plastic material and washing or cleaning agent component can be heated to between approximately 130° C. and 230° C., in particular between approximately 160° C. and 200° C. The heating can also take place by employing friction in the extruder and/or by employing additional heating devices. The extrudate subsequently only has to be cooled again, which is possible without any problems owing to the small diameter of the filaments. In this case, the at least one water-soluble plastic material and the at least one washing or cleaning agent component can be added into the extruder as a separate granulate. This increases flexibility in the production of the filaments because, for example, a water-soluble plastic material can be combined with different washing or cleaning agent components or vice versa, without having different granulates available. However, it may be particularly preferred if the granulate already comprises both the at least one water-soluble plastic material and the at least one washing or cleaning agent component. In this context, a granulate is also referred to as a master batch, i.e. in the form of a mixture having the final composition of the filament. If the granulate is already present as a mixture, the risk of producing a non-homogeneous filament is reduced.

The method for producing the washing or cleaning agent product is based on a 3D printing method known per se, but with the difference that at least one filament according to one of claims 1 to 5 is used. With the aid of at least one filament as the material, a three-dimensional washing or cleaning agent product is printed in a 3D printer. A plurality of filaments may also be used, namely simultaneously or in succession. This is useful in particular when the filaments differ with respect to their composition, in particular in relation to the at least one washing or cleaning agent component of the filaments. Depending on the combination of the filaments, the desired ingredients or the desired composition of the washing or cleaning agent product can be compounded without a filament needing to be stored for each washing or cleaning agent product.

The washing or cleaning agent product is 3D printed preferably using a print template provided to the 3D printer and using a filament according to one of claims 1 to 5. In this case, the print template is in the form of a file and comprises information concerning the gradual application of at least one material to form a three-dimensional washing or cleaning agent product. The file can in this case contain information regarding the x, y and z coordinates at which material provided by the at least one filament is printed. In addition, information can be contained regarding the x, y and z coordinates at which and from which filament printing is to take place.

Washing or cleaning agent products, and filaments and methods for producing the same are provided. A filament is provided in an exemplary embodiment. The filament includes a filament matrix and at least one washing or cleaning agent component incorporated in the filament matrix. The filament matrix is formed substantially by at least one water soluble plastic material, and the at least one washing or cleaning agent component is absorbed in the filament matrix A method of producing a filament is provided in another embodiment. The method includes heating at least one water-soluble plastic material and at least one washing or cleaning agent component in an extruder. The at least one water-soluble plastic material and the at least one washing or cleaning agent component are discharged together in one strand as an extrudate from at least one nozzle of the extruder. The extrudate is cooled after discharge from the nozzle to produce the filament.

A washing or cleaning agent product is provided in yet another embodiment. The washing or cleaning agent product includes a filament matrix and a washing or cleaning agent component incorporated into the filament matrix. The filament matrix includes a water-soluble plastic material, and the washing or cleaning agent product is printed from a 3D printer using a print template.

BRIEF DESCRIPTION OF THE DRAWINGS

The present disclosure is described in more detail in the following by reference to the drawings showing only embodiments. In the following, the term "washing agent" is also referred to as "washing agent product." However, the embodiments also apply to cleaning agents and cleaning agent products. The present disclosure will hereinafter be described in conjunction with the following drawing figures, wherein like numerals denote like elements, and.

DETAILED DESCRIPTION

Figure 1:
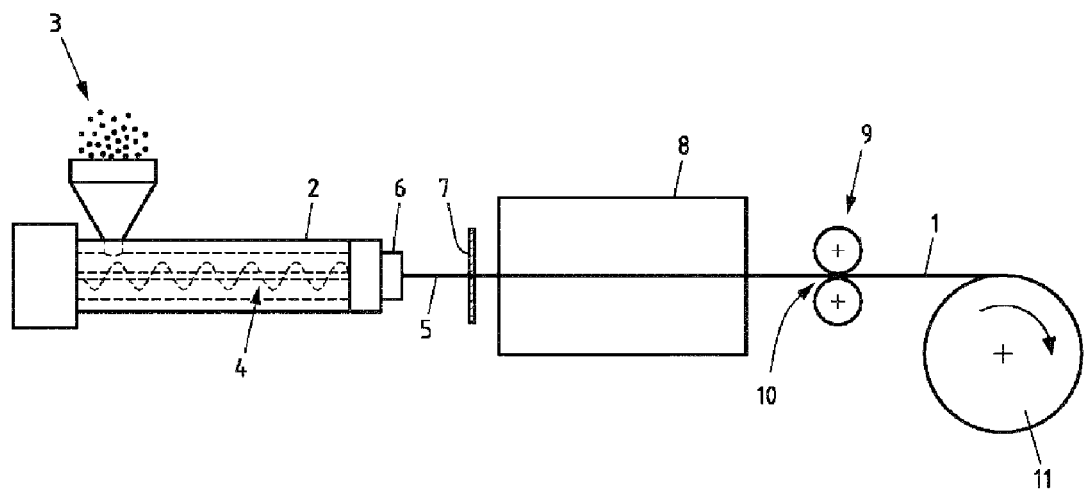
FIG. 1 is a schematic view of a method as contemplated herein for producing a filament as contemplated herein.

The following detailed description is merely exemplary in nature and is not intended to limit the disclosure or the application and uses of the subject matter as described herein. Furthermore, there is no intention to be bound by any theory presented in the preceding background or the following detailed description.

For the sake of greater clarity, and to avoid unnecessary repetitions, the filament, the methods, the washing or cleaning agent product and the print template are described together in the following, without differentiating specifically between each of the filament, the methods, the washing or cleaning agent product and the print template. For a person skilled in the art, however, it follows from the context which features are preferred in each case for the filament, the methods, the washing or cleaning agent product and the print template.

In a first particularly preferred embodiment of the filament, said filament has a diameter of between from about 0.1 mm and about 5 mm, preferably between from about 0.2 mm and about 4 mm, in particular between from about 0.3 mm and about 3 mm. Filaments having corresponding diameters can be printed on conventional 3D printers without difficulty. Moreover, sufficient material can be provided so as to print ample washing or cleaning agent product which comprises adequate amounts of at least one washing or cleaning agent component.

Alternatively or additionally, it is useful if the filament has a length of at least about 5 m, preferably at least about 10 m, in particular at least about 50 m, more particularly at least about 100 m. Filaments of this length provide sufficient material to print a considerable amount of washing agent products. The filaments can be simultaneously kept in a space-saving manner and handled in a simple manner.

In order to be able to provide a homogeneous distribution of the washing or cleaning agent component and simultaneously adequate handleability, dimensional stability and/or durability of the filament, it is useful if the at least one washing or cleaning agent component as a disperse phase is absorbed in the filament matrix as a continuous phase. In this case, the filament matrix can likewise be formed of just one component or a plurality of components, in particular water-soluble plastic materials.

Alternatively or additionally, the at least one water-soluble plastic material can be a thermoplastic plastic material. The filament can then be particularly usefully used to produce a washing or cleaning agent product by employing the fused deposition modeling (FDM) method or fused filament fabrication (FFF). The method is simple, quick and cost-effective.

Thermoplastic polymers, also referred to as thermoplastics or plastomers, are linear or branched macromolecules which are not crosslinked and can be melted in an indecomposable manner, meaning that they can be reversibly deformed in a particular temperature range. A distinction can be made here between amorphous thermoplastics and crystalline thermoplastics. The polymer chains of amorphous thermoplastics have a disordered, random structure ("solidified melt"). For semi-crystalline thermoplastics, the amorphous polymer chains form a matrix in which the polymer crystallites are embedded. Thermoplastics can become flowable above the glass transition temperature (Tg) in the case of amorphous thermoplastics and above the melting temperature (Tm) in the case of (semi-)crystalline thermoplastics. Said thermoplastics can be processed in the softened state by pressing, extruding, injection molding or other shaping methods so as to form shaped parts. In principle, all thermoplastics can be used, in particular water-soluble amorphous thermoplastics and/or crystalline thermoplastics.

By heating an amorphous plastic material above the glass transition temperature Tg, the polymer chains begin to flow, and the material consequently becomes soft and deformable. Semi-crystalline polymers are present above Tg initially as a tough-elastic polymer and above the melting temperature Tm of the crystalline regions as an isotropic melt. This reversable deformability of thermoplastics by employing heating allows thermal processing of said plastic materials above Tg or Tm, for example by employing extrusion.

The filament can be produced in a particularly simple manner and processed to form a washing or cleaning agent product when the at least one water-soluble plastic material is a polyvinyl alcohol. The polyvinyl alcohol additionally has very good water solubility, meaning that the plastic material does not form any residues during washing. This applies in particular when the polyvinyl alcohol is partially saponified and thus has a proportion of polyvinyl acetate of in particular less than about 30 wt. %, preferably less than about 20 wt. %, in particular less than about 15 wt. %. The degree of saponification also determines whether the polyvinyl alcohol is cold-water-soluble or hot-water-soluble. Up to a proportion of about 1 wt. % polyvinyl acetate there is hot-water solubility. Up to a proportion of about 12 wt. % polyvinyl acetate there is cold-water solubility. These basic parameters apply to the polyvinyl alcohol copolymer, which is composed of vinyl alcohol and vinyl acetate units. However, the term polyvinyl alcohol also includes copolymers which, in addition to vinyl alcohol and vinyl acetate units, also have units selected from the group including acrylic acid, methacrylic acid, cis-2-butenoic acid, 3-butenoic acid, cinnamic acid, phenylcinnamic acid, pentenoic acid, methylenemalonic acid, acrylamide, maleic acid, itaconic acid, 2-acrylamido-2-methylpropane sulfonic acid (AMPS) and the alkali metal and ammonium salts thereof. Alternatively or additionally, polyethylene glycol, cetylstearyl alcohol and/or stearyl alcohol can also be used as the water-soluble plastic material. These plastic materials can also be easily processed and are readily soluble in water. Which plastic material or materials are specifically preferred for producing the filament may also depend on the washing or cleaning agent component used; the individual components should in particular be readily mixable and combine well.

The at least one washing or cleaning agent component may be at least one component from the group including surfactants, alkalis, builders, graying inhibitors, optical brighteners, hueing dyes, enzymes, bleaching agents, photobleaching agents, photocatalysts, soil release polymers, fillers, plasticizers, fragrances, anti-odor substances such as zinc ricinoleates, dyes, nourishing agents, acids, starches, isomalt, sugar, cellulose, cellulose derivatives, carboxymethyl cellulose, polyetherimide, silicone derivatives, polymethylimines and mixtures thereof.

In various embodiments as contemplated herein, the at least one surfactant is an amphoteric surfactant and/or anionic surfactant, preferably a betaine and/or alky ether sulfate. The betaines are preferably alkylamidopropyl betaines, in particular linear C8-C16 alkylamidopropyl betaines, most particularly preferably cocoamidopropyl betaine, which contains {3-(dodecanoylamino)propyl(dimethyl)ammonio}acetate as a main component. Corresponding betaines are commercially available from Evonik Industries under the trade name Tego® Betain, for example.

Anionic surfactants that are used are those of the sulfonate and sulfate types, for example. Surfactants of the sulfonate type that can be used are preferably C9-13 alkylbenzene sulfonates, olefin sulfonates, i.e. mixtures of alkene and hydroxyalkane sulfonates, and disulfonates, as obtained, for example, from C12-18 monoolefins having a terminal or internal double bond by way of sulfonation with gaseous sulfur trioxide and subsequent alkaline or acid hydrolysis of the sulfonation products. Also suitable are alkane sulfonates obtained from C12-18 alkanes, for example by way of sulfochlorination or sulfoxidation with subsequent hydrolysis or neutralization. Likewise, the esters of α-sulfofatty acids (ester sulfonates) are suitable, for example the α-sulfonated methyl esters of hydrogenated coconut fatty acids, palm kernel fatty acids or tallow fatty acids.

Suitable alkylbenzene sulfonates are preferably selected from linear or branched alkylbenzene sulfonates. A preferred representative is sodium dodecyl benzyl sulfonate.

The alkali salts and in particular the sodium salts of the sulfuric acid half-esters of C12-C18 fatty alcohols, for example from coconut fatty alcohol, tallow fatty alcohol, lauryl alcohol, myristyl alcohol, cetyl alcohol or stearyl alcohol, or of C10-C20 oxo alcohols and the half-esters of secondary alcohols having this chain length, are preferred as alk(en)yl sulfates. Alk(en)yl sulfates of the mentioned chain length that contain a synthetic straight-chain alkyl functional group prepared on a petrochemical basis and have a degradation behavior similar to that of the adequate compounds based on fatty chemical raw materials are also preferred. From a washing perspective, the C12-C16 alkyl sulfates, C12-C15 alkyl sulfates and C14-C15 alkyl sulfates are preferred.

The sulfuric acid monoesters of straight-chain or branched C7-21 alcohols ethoxylated with from about 1 to about 6 mol of ethylene oxide, such as 2-methyl-branched C9-11 alcohols having, on average, about 3.5 mol ethylene oxide (EO) or C12-18 fatty alcohols having from about 1 to about 7 EO, are also suitable.

In various embodiments, the alkylether sulfate can be selected from fatty alcohol ether sulfates. Preferred representatives are Na-C12-14 fatty alcohol ether sulfates having about 2 mol EO (ethylene oxide). The degree of ethoxylation indicated represents a statistical average that can correspond to an integer or a fractional number for a specific product. The degrees of alkoxylation indicated represent statistical averages that can correspond to an integer or a fractional number for a specific product. Preferred alkoxylates/ethoxylates have a narrowed homolog distribution (narrow range ethoxylates, NRE).

Further anionic surfactants that can also be used are in particular soaps. Saturated fatty acid soaps are suitable, such as the salts of lauric acid, myristic acid, palmitic acid, stearic acid, hydrogenated erucic acid and behenic acid, and in particular soap mixtures derived from natural fatty acids, such as coconut fatty acids, palm kernel fatty acids or tallow fatty acids. The anionic surfactants, including the soaps, can be present in the form of the sodium, potassium or ammonium salts thereof, or as soluble salts of organic bases, such as monoethanolamine, diethanolamine or triethanolamine. The anionic surfactants are preferably present in the form of the sodium, potassium or magnesium salts thereof, and in particular in the form of the sodium salts. Anionic surfactants, including the soaps, i.e. in particular the alkylbenzene sulfonates, alkylether sulfates and soaps, are contained in the washing and cleaning agents preferably in a particular proportion by weight, specifically for example with from about 5 to about 50 wt. % based on the total weight of the washing agent formulation. Amounts of from about 7 to about 20 wt. % anionic surfactants based on the total weight of the washing agent formulation are preferred. Irrespectively of whether the washing agent contains one or more of the anionic surfactants, the specified amounts relate to the total amount of all anionic surfactants contained in the washing agent.

In addition to the mentioned amphoteric and anionic surfactants, the mixtures may also, alternatively or additionally, contain non-ionic surfactants. Non-ionic surfactants that are preferably used are alkoxylated, advantageously ethoxylated, in particular primary alcohols having preferably from about 8 to about 18 C atoms and, on average, from about 1 to about 12 mols of ethylene oxide (EO) per mol of alcohol, in which the alcohol functional group can be linear or preferably methyl-branched in the 2 position, or can contain linear and methyl-branched functional groups in admixture, as are usually present in oxo alcohol functional groups. However, alcohol ethoxylates having linear functional groups of alcohols of native origin having from about 12 to about 18 C atoms, for example of coconut alcohol, palm alcohol, tallow fatty alcohol or oleyl alcohol, and an average of from about 2 to about 8 EO per mol of alcohol, are particularly preferred. Preferred ethoxylated alcohols include C12-14 alcohols having about 3 EO or about 4 EO, C9-11 alcohols having about 7 EO, C13-15 alcohols having about 3 EO, about 5 EO, about 7 EO or about 8 EO, C12-18 alcohols having about 3 EO, about 5 EO or about 7 EO, and mixtures thereof, such as mixtures of C12-14 alcohol having about 3 EO and C12-18 alcohol having about 5 EO. The degrees of ethoxylation indicated represent statistical averages that can correspond to an integer or a fractional number for a specific product. Preferred alcohol ethoxylates have a narrowed homolog distribution (narrow range ethoxylates, NRE). In addition to these non-ionic surfactants, fatty alcohols having more than about 12 EO can also be used. Examples of these are tallow fatty alcohols having about 14 EO, about 25 EO, about 30 EO, or about 40 EO.

Another class of non-ionic surfactants that are preferably used, which are used either as the sole non-ionic surfactant or in combination with other non-ionic surfactants, is alkoxylated, preferably ethoxylated or ethoxylated and propoxylated fatty acid alkyl esters, preferably having from 1 to 4 carbon atoms in the alkyl chain, in particular fatty acid methyl esters. Another class of non-ionic surfactants that can advantageously be used is the alkyl polyglycosides (APG).

Non-ionic surfactants of the amine oxide type, for example N-cocoalkyl-N,N-dimethylamine oxide and N-tallow alkyl-N,N-dihydroxyethylamine oxide, and of the fatty acid alkanolamides can also be suitable. The amount of these non-ionic surfactants is preferably no more than that of the ethoxylated fatty alcohols, in particular no more than half thereof.

Alkalis improve the washing behavior, for instance by neutralization, saponification or by improving the action of surfactants or enzymes. Silicates, carbonates and hydroxides are preferred, for example. Builders are preferably compounds that remove hardness-producing substances such as calcium and magnesium. Builders are, for example, zeolites, phosphates, phosphonates or acrylates and are used, for example, for ion exchange or complex formation. Graying inhibitors are anti-redeposition agents and are, for example, carboxymethyl cellulose or polycarboxylates. In contrast, optical brighteners are colorless pigments which absorb ultraviolet light and reflect visible light. Bleaching agents can be sodium percarbonate for oxidizing the dirt, for example. In addition, tetraacetylethylenediamine (TAED) can also be used as a bleach activator. In contrast, starch is used in order to give a shine to the laundry. Soil release polymers make textile fibers stain-resistant and thus also increase the effect of the washing agent product. In this case, soil release polymers are hydrophilic polymers, for example. Photobleach leads to a range of different photochemical reactions in which the fluorophore is damaged or modified in a light-induced manner. Hueing dyes improve the degree of whiteness of surfaces and textiles.

Within the meaning of this present disclosure, fillers are basically non-washing-active substances which are added for process reasons (e.g. extrudability or granulatability) and/or dilute the product to the desired active substance content.

The term "plasticizer" is used as contemplated herein in accordance with DIN 55945: 1999-07 and thus denotes "liquid or solid indifferent organic substances having low vapor pressure, mainly those of ester-like nature. Said substances can physically interact with high-polymer substances and form a homogeneous system therewith without chemical reaction, preferably by employing their dissolving and swelling power, in some cases however also without said power. Plasticizers give the structures or coatings produced thereby particular sought-after physical properties, for example lowered glass transition temperatures, increased malleability, increased elastic properties, reduced hardness and optionally enhanced adhesion." In various embodiments as contemplated herein, the at least one plasticizer is selected from the group including glycerol, ethylene glycol, diethylene glycol, 1,2-propanediol, 1,3-propanediol, sorbitol, and mixtures thereof.

If required, the at least one washing or cleaning agent component may comprise at least one thickener, in particular a thickener selected from the group including gelatin, cellulose, pullulan, starch, modified starch, methylcellulose, carboxymethylcellulose (CMC), hydroxypropyl methylcelluloses (HPMCs) and polyethylene oxides. As a result, compositions that can foam more effectively are achieved. Especially preferred thickeners are polyethylene oxides. For example, the commercial product POLYOX® from the company Dow can be used as a polyethylene oxide thickener. These polyethylene oxides are non-ionic and have a high molecular weight. In addition, they have many typical properties of other classes of water-soluble polymers, for example a lubricant property, a binder property, water retention, thickening and film-forming ability.

In various embodiments, the liquid mixture can further comprise one or more components which are usually used in washing and cleaning agents. Said components include but are not limited to the group including enzymes, bleaching agents, bleach activators, complexing agents, builders, electrolytes, non-aqueous solvents, pH adjusters, perfumes, perfume carriers, fluorescing agents, optical brighteners, dyes, hydrotropic substances, silicone oils, bentonites, anti-redeposition agents, graying inhibitors, anti-shrink agents, anti-crease agents, dye transfer inhibitors, fillers, antimicrobial active ingredients, germicides, fungicides, antioxidants, preservatives, corrosion inhibitors, antistatic agents, bittering agents, ironing aids, repellents and impregnating agents, anti-swelling and anti-slip agents, and UV absorbers.

Additional ingredients of the method products as contemplated herein can be inorganic and organic builders. Soluble and/or insoluble components that react in a slightly acidic, neutral or alkaline manner are generally suitable as organic and inorganic builders, which components make it possible for calcium ions to precipitate or to bind in a complex manner. The inorganic builders include water-insoluble or non-water-insoluble ingredients, such as aluminosilicates and in particular zeolite.

Further suitable builders are polyacetals which can be obtained by reacting dialdehydes with polyol carboxylic acids having from 5 to about 7 C atoms and at least 3 hydroxyl groups. Preferred polyacetals are obtained from dialdehydes such as glyoxal, glutaraldehyde, terephthalaldehyde and mixtures thereof, and from polyol carboxylic acids such as gluconic acid and/or glucoheptonic acid.

Further suitable organic builders are dextrins, for example oligomers or polymers of carbohydrates, which can be obtained by the partial hydrolysis of starches. The hydrolysis can be carried out according to customary methods, for example acid- or enzyme-catalyzed methods. These dextrins are preferably hydrolysis products having an average molar mass in the range of from about 400 to about 500,000 g/mol. In this case, a polysaccharide having a dextrose equivalent (DE) in the range of from about 0.5 to about 40, in particular from about 2 to about 30, is preferred, DE being a customary measure for the reducing effect of a polysaccharide compared with dextrose, which has a DE of 100. It is possible to use both maltodextrins having a DE of between from about 3 and about 20 and dried glycose syrups having a DE of between from about 20 and about 37, as well as what are known as yellow dextrins and white dextrins having higher molar masses in the range of from about 2,000 to about 30,000 g/mol. A preferred dextrin is described in the British patent application 94 19 091. Oxidized derivatives of dextrins of this type are the reaction products thereof with oxidizing agents which are capable of oxidizing at least one alcohol function of the saccharide ring to form a carboxylic acid function.

Oxydisuccinates and other derivatives of disuccinates, preferably ethylenediamine disuccinate, are further suitable cobuilders. In this case, ethylenediamine-N,N'-disuccinate (EDDS) is preferably used in the form of the sodium or magnesium salts thereof. Glycerol disuccinates and glycerol trisuccinates are also preferred in this context. Suitable use amounts are for example from about 3 to about 15 wt. %, based on the total washing or cleaning agent. Further suitable organic cobuilders are, for example, acetylated hydroxycarboxylic acids or the salts thereof, which optionally can also be present in lactone form and comprise at least 4 carbon atoms and at least one hydroxy group, as well as no more than two acid groups.

A further class of substances having cobuilder properties is that of phosphonates. These include, in particular, hydroxyalkane and aminoalkane phosphonates. Among the hydroxyalkanephosphonates, 1-hydroxyethane-1,1-diphosphonate (HEDP) is of particular importance as a cobuilder. It is preferably used as a sodium salt, the disodium salt reacting neutral and the tetrasodium salt reacting alkaline (pH 9). Possible preferable aminoalkane phosphonates include ethylenediamine tetramethylene phosphonate (EDTMP), diethylentriamine pentamethylene phosphonate (DTPMP) and the higher homologs thereof. They are preferably used in the form of the neutrally reacting sodium salt, for example as the hexasodium salt of EDTMP or as the hepta- and octa-sodium salt of DTPMP. Of the class of phosphonates, HEDP is preferably used as a builder. The aminoalkane phosphonates additionally have a pronounced heavy-metal-binding power. Accordingly, it may be preferred, in particular if the washing or cleaning agents also contain bleach, to use aminoalkane phosphonates, in particular DTPMP, or to use mixtures of the mentioned phosphonates.

The preferred builders also include amorphous sodium silicates which have an $Na_2O:SiO_2$ modulus of from about 1:2 to about 1:3.3, preferably from about 1:2 to about 1:2.8, and in particular from about 1:2 to about 1:2.6, and have secondary washing properties. Compressed/compacted amorphous silicates, compounded amorphous silicates and overdried X-ray amorphous silicates are particularly preferred. The content of the (X-ray) amorphous silicates in particular zeolite-free agents is preferably from about 1 to about 10 wt. %, which corresponds to a preferred embodiment as contemplated herein.

Particularly preferred inorganic water-soluble builders are alkali metal carbonates and alkali metal bicarbonates, the preferred embodiments including sodium carbonate and potassium carbonate and in particular sodium carbonate. The content of the alkali metal carbonates in particular zeolite-free agents can vary within very broad limits and is preferably from about 1 to about 50 wt. %, advantageously from about 5 to about 40 wt. %, in particular from about 8 to about 30 wt. %, the content of alkali metal carbonates usually being higher than that of (X-ray) amorphous silicates. According to another preferred embodiment, the washing or cleaning agent as contemplated herein is preferably free of alkali metal carbonates. Suitable organic builders are, for example, polycarboxylic acids that can be used in the form of the alkali salts and in particular sodium salts thereof, such as citric acid, adipic acid, succinic acid, glutaric acid, tartaric acid, saccharic acids, aminocarboxylic acids, nitrilotriacetic acid (NTA), provided that the use thereof is not objectionable for ecological reasons, and mixtures thereof. Preferred salts are the salts of polycarboxylic acids such as citric acid, adipic acid, succinic acid, glutaric acid, tartaric acid, saccharic acids, and mixtures thereof. The acids can also be used per se. In addition to their builder effect, the acids typically also have the property of being an acidification component and are thus also used, for example in the method products as contemplated herein, for setting a lower and milder pH of washing or cleaning agents. Particularly noteworthy here are citric acid, succinic acid, glutaric acid, adipic acid, gluconic acid, and any mixtures thereof.

Polymeric polycarboxylates are further suitable as organic builders. These are, for example, the alkali metal salts of polyacrylic acid or of polymethacrylic acid, for example those having a relative molecular mass of from about 500 to about 70,000 g/mol. For the purpose of this document, the molar masses given for polymeric polycarboxylates are weight-average molar masses $M_w$ of the particular acid form which have been determined in principle using gel permeation chromatography (GPC), a UV detector having been used. The measurement was carried out against an external polyacrylic acid standard which, owing to the structural relationship thereof with the tested polymers, yields realistic molecular weight values. These specifications differ significantly from the molecular weight specifications for which polystyrene sulfonic acids are used as the standard. The molar masses measured against polystyrene sulfonic acids are generally significantly higher than the molar masses specified in this document.

The other frequently used components of washing and cleaning agents include graying inhibitors (anti-redeposition agents), bleaching agents and bleach activators, optical brighteners, enzymes, fabric-softening substances, dyes and fragrances, as well as neutral salts.

From the group of compounds which act as bleaching agents and yield $H_2O_2$ in water, sodium perborate tetrahydrate ($NaBO_2.H_2O_2.3\ H_2O$), and sodium perborate monohydrate ($NaBO_2.H_2O_2$) are of particular significance. Some other examples of suitable bleaching agents are peroxy carbonate ($Na_2CO_3.1.5\ H_2O_2$), peroxypyrophosphates, citrate perhydrates, and $H_2O_2$-yielding peracidic salts or peracids, such as perbenzoates, peroxophthalates, diperazelaic acid, or diperdodecane diacid. The content of bleaching agents in the agent is preferably from about 5 to about 25 wt. %, and in particular from about 10 to about 20 wt. %, peroxy carbonate advantageously being used. Photobleach and photocatalysts, such as tetrabenzo-tetraazaporphine, or zinc or aluminum phthalocyanine sulfate, can also be used.

Bleach activators may be incorporated into the preparations to obtain an improved bleaching effect when washing at temperatures of about 60° C. and less. Examples thereof are N-acyl or O-acyl compounds that form organic peracids with $H_2O_2$, preferably N,N'-tetraacylated diamines, such as N,N,N',N'-tetraacetylethylenediamine, further carboxylic acid anhydrides and esters of polyols such as glucose pentaacetate. The content of bleach activator in the bleaching-agent-containing agent is in the normal range, preferably between from about 1 and about 10 wt. % and in particular between from about 3 and about 8 wt. %.

The function of graying inhibitors is to keep the dirt that is removed from the fiber suspended in the liquor and in this way prevent graying. Water-soluble colloids, which are usually organic, are suitable for this purpose, for example water-soluble salts of polymeric carboxylic acids, sizing material, gelatin, salts of ethercarboxylic acids or ethersulfonic acids of starch or of cellulose, or salts of acidic sulfuric acid esters of cellulose or of starch. Water-soluble polyamides containing acid groups are also suitable for this purpose. Furthermore, soluble starch preparations and starch products other than those mentioned above can be used, for example degraded starch, aldehyde starches, etc. Polyvinylpyrrolidone is also suitable. Carboxymethylcellulose (Na salt), methylcellulose, methylhydroxyethylcellulose, and mixtures thereof as well as polyvinylpyrrolidone are preferably used, in particular in amounts of from about 0.5 to about 5 wt. %, based on the agent.

The washing agents may contain derivatives of diaminostilbene disulfonic acid or the alkali metal salts thereof as optical brighteners. Suitable are, for example, salts of 4,4'-bis(2-anilino-4-morpholino-1,3,5-triazine-6-ylamino)-stilbene-2,2'-disulfonic acid or compounds having a similar structure which, instead of the morpholino group, carry a diethanolamino group, a methylamino group, an anilino group or a 2-methoxyethylamino group. Furthermore, brighteners of the substituted 4,4'-distyryl-di-phenyl type may also be present; for example, the compound 4,4'-bis(4-chloro-3-sulfostyryl)-diphenyl. Mixtures of the aforementioned brighteners may also be used.

Enzymes from the class of proteases, lipases and amylases or mixtures thereof can be used as enzymes. Enzymatic active ingredients obtained from strains of bacteria or fungi such as *Bacillus subtilis, Bacillus licheniformis* and *Streptomyces griseus* are particularly suitable. Preferably, subtilisin-type proteases and in particular proteases obtained from *Bacillus lentus* are used. The enzymes may be adsorbed to substrates and/or embedded in shell substances to prevent them from decomposing prematurely.

The salts of polyphosphonic acids, in particular 1-hydroxyethane-1,1-diphosphonic acid (HEDP) can be used as stabilizers in particular for percompounds and enzymes.

This enumeration of further washing and cleaning agent ingredients is by no means exhaustive, but merely reflects the most essential typical ingredients of such agents. The washing and cleaning agents described herein in various embodiments as contemplated herein can therefore contain diverse additional ingredients that are not described herein but are known in the prior art.

In a first particularly preferred embodiment of the method for producing the filament, the extrudate is not cooled with water as is otherwise customary. The extrudate is cooled by employing a gas or gas mixture, although in particular air is useful for the sake of simplicity in terms of handling. In principle, cooling with a gas or gas mixture prevents the filament matrix from dissolving or prevents the at least one washing or cleaning agent component being dissolved out of the filament matrix. This would lead to undesired losses and compromise the desired application of the filaments. Cooling by employing gases basically has the drawback of lower heat transfer; however, this will be tolerable in many cases owing to the thin filaments. In order to be able to provide better heat transfer, the cooling is provided by a liquid, a liquid mixture and/or a solution, it being preferably intended for the liquid, the liquid mixture and/or the solvent not to be aqueous, in order to prevent the filament matrix from dissolving or to prevent the at least one washing or cleaning agent component being dissolved out of the filament matrix.

Irrespective of the type of cooling of the extrudate, the filament is in particular cut to length and/or wound up in particular after the cooling process. The filament can be would up as a coil, specifically onto a spool, it being possible for a spool to be omitted as required. The use of a spool has the advantage that the filament can be mounted and transported on the spool, in order to prevent the filament from being damaged, for instance to prevent the filament from breaking. However, without this spool, the spool and the handling thereof can be eliminated. It therefore needs to be decided on a case-by-case basis which advantages prevail.

In a first particularly preferred embodiment of the washing or cleaning agent product, said product has the form of a tablet, a strip, a film, a honeycomb structure or a sphere. It is particularly advantageous if the product has a honeycomb-like structure through which water can flow. The shape in which the washing or cleaning agent product is printed can be selected such that it can be handled and stored in a simple and space-saving manner. In addition, the shape and the size of the washing or cleaning agent product can be selected such that the washing or cleaning agent product dissolves at the desired speed during the wash cycle and/or the washing or cleaning agent product releases the at least one washing or cleaning agent component at the desired speed during the wash cycle. Especially suitable for this purpose is a honeycomb-like structure through which water can flow and which thus dissolves quicker in the washing liquor or in the dispensing compartment.

In order to be able to adapt the washing or cleaning agent to the respective requirements for an optimum washing process, the washing or cleaning agent product, in particular different portions of the washing or cleaning agent product, can be printed from different filaments. In this case, the different filaments can have at least partly different washing or cleaning agent components. A large variety of different washing or cleaning agent products that are adapted to specific applications can thus be printed from a limited number of different filaments.

When 3D printing the washing or cleaning agent product, material of different filaments can be printed next to one another and also, if required, simultaneously. This is useful if the corresponding washing or cleaning agent components are intended to dissolve together, for example. If a first material of the washing or cleaning agent product is intended to dissolve first and another material of the washing or cleaning agent product is intended to dissolve only after a time delay, at least one inner portion of the washing or cleaning agent product can be printed using one filament and an outer portion that surrounds the inner portion of the washing or cleaning product can be printed using another filament. In this case, the outer portion preferably completely surrounds the inner portion so as to ensure a time-staggered dissolution. If required, more than two portions can also be combined in this manner, specifically one inside the other, for instance in the sense of layers of an onion. However, outer portions that each surround an inner portion of another material may also be provided next to one another.

In particular embodiments, the washing or cleaning agent product can have a container that has been produced by employing 3D printing.

If required, the washing and cleaning agent can be embedded in a closed or honeycomb-like, floodable plastic container by employing a dual 3D printing method. In the case of a machine washing or cleaning agent, this plastic shell can also include water-soluble material such as PVA. The advantage of this shell is that the consumer does not directly come into contact with the washing or cleaning agent. In addition, the container is used to continuously dispense the washing and cleaning agent, for example in the case of a cleaning agent (e.g. toilet rim block with hanger). A dual or multi 3D printing method is suitable for embedding the washing or cleaning agent product in a closed or honeycomb-like, floodable plastic container.

In a first particularly preferred washing agent product, said product has the form of a tablet, a strip, a film, a honeycomb structure or a sphere. The washing agent product can thus be easily handled and/or stored. In addition, the shape and the size of the washing agent product can be selected such that the washing agent product dissolves at the desired speed during the wash cycle and/or releases the at least one washing agent component at the desired speed during the wash cycle.

Alternatively or additionally, different portions, in particular at least one inner portion and at least one outer portion that surrounds the inner portion, preferably completely, are printed from at least partly different filaments. In this way, washing agent components can be dispensed together and/or in a time-staggered manner. For example, the washing agent component of the inner portion only dissolves when the outer portion has at least substantially dissolved.

In particular embodiments, when the filament is printed by employing a second nozzle, the filament is combined with a jet of macrocapsules. Macrocapsules are core-shell structures having a size of from about 1 mm to about 30 mm in diameter. Active substances, in particular fragrances, are located in the core. This makes it possible to provide the printed filament with an active substance without subjecting said substance to the printing process of the filament. The selection of the active substance in the macrocapsules may be specified in some embodiments. In other embodiments, said selection can be determined by the consumer. The consumer can thus determine, for example, the perfume in the macrocapsules that are combined with the printed filament. The macrocapsules can be provided in such a way that, during the printing process, the content is blended with the printed filament and/or the intact capsules are enclosed by the printed filament. Finally, said embodiment makes it possible to integrate active substances into the printed filament in a targeted manner. This can be subsumed under the term "mass customization."

Examples

Some examples of compositions of filaments having preferred properties are given in the following.

Table 1 indicates the interval ranges of the proportions of classes of ingredients of filaments for three examples, Examples 1 to 3, in wt. %. The interval ranges of the classes of ingredients are to be understood such that the proportions within the interval ranges can be selected such that the corresponding proportions add up to at least substantially 100%. A small remainder formed by components that are not listed may be permissible. A proportion of less than 5 wt. %, in particular less than 3 wt. %, preferably less than 1 wt. % is conceivable as the remainder, for example. The composition of the filament according to Example 1 provides the greatest flexibility. In particular, the filament may have only selected washing agent components in addition to the water-soluble plastic material. This is useful when, for a particular washing task, particular classes of ingredients can be omitted, or when the washing agent product is printed from a plurality of different filaments. The washing agent product can thus have a different composition in some ranges compared with in another range, for example. At least one inner portion of the washing agent product and at least one outer portion of the washing agent product that can surround the inner portion, preferably completely, are preferably different with respect to the composition. In principle, a large variety of different washing agent products can thus be printed by employing 3D printing using a small number of different filaments. This can also be applied to cleaning agents.

Example 2 according to Table 1 shows filaments which have all of the listed classes of ingredients, even if in some cases only small amounts can be provided. A washing agent product can therefore preferably be printed at least substantially from one filament according to Example 2, although this is not required. Filaments according to Example 3 of Table 1 have the classes of ingredients in narrower ranges compared with Example 2. Using the corresponding filaments, washing agent products can be printed which have many different properties, which also become clearly apparent in the washing process. In particular, effective washing agent products can thus be printed using a single filament.

TABLE 1

Exemplary compositions

| | Example 1 in wt. % | Example 2 in wt. % | Example 3 in wt. % |
|---|---|---|---|
| Polyvinyl alcohol (PVA) | 60-90 | 60-90 | 70-80 |
| Surfactants | 1-30 | 5-30 | 10-20 |
| Soil release polymers | 0-1 | 0.1-1 | 0.1-0.5 |
| Enzymes | 0-2 | 0.01-1 | 0.1-1 |
| Photobleach | 0-0.1 | 0.005-0.1 | 0.01-0.03 |
| Bleaching agents and/or fragrances | 0-1 | 0.01-1 | 0.1-0.5 |
| Fillers and plasticizers (e.g. PEG, isomalt, sugar, soap, cellulose and/or starch) | 0-15 | 1-15 | 5-10 |

Table 2 indicates the proportions of components of examples of particular filaments, Examples 4 to 6, having preferred properties at least for particular applications. The filaments according to Examples 4 to 6 can be used for producing washing agent products in particular without other filaments, since the filaments have all of the essential components for a plurality of applications. The compositions are therefore also referred to as complete compositions, but can of course also be used together with other filaments to produce washing agent products, for instance in order to adapt the washing agent product to specific applications.

TABLE 2

Exemplary compositions

| | Example 4 in wt. % | Example 5 in wt. % | Example 6 in wt. % |
|---|---|---|---|
| C12-18 fatty alcohols with 7 mol EO | 2 | 2 | 2 |
| C12-18 fatty alcohol sulfates with 7 mol EO (sodium salt) | 1.5 | 1.5 | 1.5 |
| Linear alkylbenzene sulfonates (sodium salt) | 10 | 10 | 10 |
| Sodium carbonate | 20 | 20 | 5 |
| Sodium hydrogencarbonate | 6.5 | 0 | 0 |
| Sodium disilicate | 4 | 4 | 4 |
| Sodium percarbonate | 17 | 17 | 0 |
| Tetraacetylethylenediamine (TAED) | 4 | 4 | 0 |
| Polyacrylate (sodium salt) | 3 | 3 | 3 |
| Carboxymethylcellulose (sodium salt) | 1 | 1 | 1 |
| Phosphonate | 1 | 1 | 1 |
| Sodium sulfate | 1 | 1 | 1 |
| Enzymes | 1 | 1 | 1 |
| Fragrance | 0.9 | 0.9 | 0.9 |
| Optical brightener | 0.08 | 0.08 | 0.08 |
| Tetrabenzo-tetraazaporphine (Tinolux) | 0.011 | 0.011 | 0.011 |
| Polyethylene glycol (PEG) 1000 (molar mass) | 24 | 0 | 0 |
| Polyvinyl alcohol (PVA) | 0 | ≤100 | ≤100 |

Table 3 indicates compositions of filaments which are likewise suitable as a washing agent product. In order to provide additional properties of the washing agent product, another composite filament can be used to print the washing agent product in addition to the corresponding filament from Table 3.

TABLE 3

Exemplary compositions

| | Example 7 | Example 8 | Example 9 |
|---|---|---|---|
| C12-18 fatty alcohol with 7 EO | 2 | 2 | 2 |
| C12-18 fatty alcohol sulfates with 7 EO (sodium salt) | 1.5 | 1.5 | 1.5 |
| Linear alkylbenzene sulfonates (sodium salt) | 10 | 10 | 10 |
| Sodium carbonate | 10 | 10 | 0 |
| Sodium disilicate | 4 | 4 | 4 |
| Sodium percarbonate | 17 | 17 | 0 |
| Polyacrylate (sodium salt) | 3 | 3 | 3 |
| Carboxymethylcellulose (sodium salt) | 1 | 1 | 1 |
| Phosphonate | 1 | 1 | 1 |
| Sodium sulfate | 1 | 0 | 0 |
| Enzymes | 10 | 10 | 10 |
| Fragrance | 0.9 | 0.9 | 0.9 |
| Tetrabenzo-tetraazaporphine (Tinolux) | 0.011 | 0.011 | 0.011 |
| Polyethylene glycol (PEG) 1000 (molar mass) | ≤100 | 0 | 0 |
| Polyvinyl alcohol (PVA) | 0 | ≤100 | ≤100 |

The corresponding components fulfill functions which are generally known for washing agents. The polyvinyl alcohol and the polyethylene glycol form the water-soluble plastic material and thus the filament matrix.

Moreover, the composition according to Table 4 has proven to be particularly suitable for a filament. Minor variations to this composition are permissible in principle.

TABLE 4

Filament composition

| | Example 10 in wt. % |
|---|---|
| Polyvinyl alcohol (PVA) | 75 |
| Linear alkylbenzene sulfonate (sodium salt) | 15 |
| Soil release polymer (Texcare SRA300F) | 0.2 |
| Photobleach | 0.02 |
| Polyethylene glycol (PEG12000S) | 9.78 |

FIG. 1 is a schematic view of a method for producing a filament 1 for producing a washing agent product by employing 3D printing. In a first step, at least one granulate 3 is fed to an extruder 2. The particles of the granulate 3 can already have the composition of the filament 1 to be produced, such that only one granulate 3 needs to be supplied. However, the granulate 3 first has to be produced according to the desired composition of the filament 1. This preferably takes place using an extruder. Alternatively, different granulates 3 having different compositions can also be fed to the extruder 2 in a particular ratio to one another, such that the composition of the filament 1 is produced in the extruder 2.

The granulate 3 is at least partially melted or softened in the extruder. Depending on the composition of the filaments 1, not all of the components melt or soften at the preferred temperatures of 130° C.-230° C., in particular 160° C.-200° C. In particular, however, at least one thermoplastic plastic material is provided, which melts and in which the remaining components are then at least substantially homogeneously distributed in the extruder 2. The at least one thermoplastic plastic material is particularly preferably the at least one water-soluble plastic material, which can thus form the filament matrix and absorb the remaining components therein. The plastic material then preferably forms the continuous phase, in which the remaining components are absorbed as a disperse phase in an as homogeneous a manner as possible. The compound produced in the extruder 2 is pressed out of at least one nozzle 6 of the extruder 2, via the at least one screw 4 in the extruder 2, as a strand 5.

In the method shown and in this respect preferred, the extrudate is then drawn through an opening in a plate 7, e.g. a perforated disk, which provides the size and the shape of the subsequent filament 1. In addition, in the method shown, a technique 8 for cooling the extrudate is provided, which technique brings the extrudate into contact with a cooling air flow or a non-aqueous cooling medium for direct heat exchange.

The cooled extrudate then forms the filament 1, which is guided via transport rollers 9 or through the at least one roll nip 10 of the transport rollers 9, which remove the extrudate from the extruder 2 and draw said extrudate through the perforated disk 7 and the cooling device 8. The filament 1 can also be wound up onto a spool 11 under tension, meaning that the transport rollers 9 would then not be required. In the method shown and in this respect preferred, the filament 1 is wound up onto the spool 11.

Figure 2:
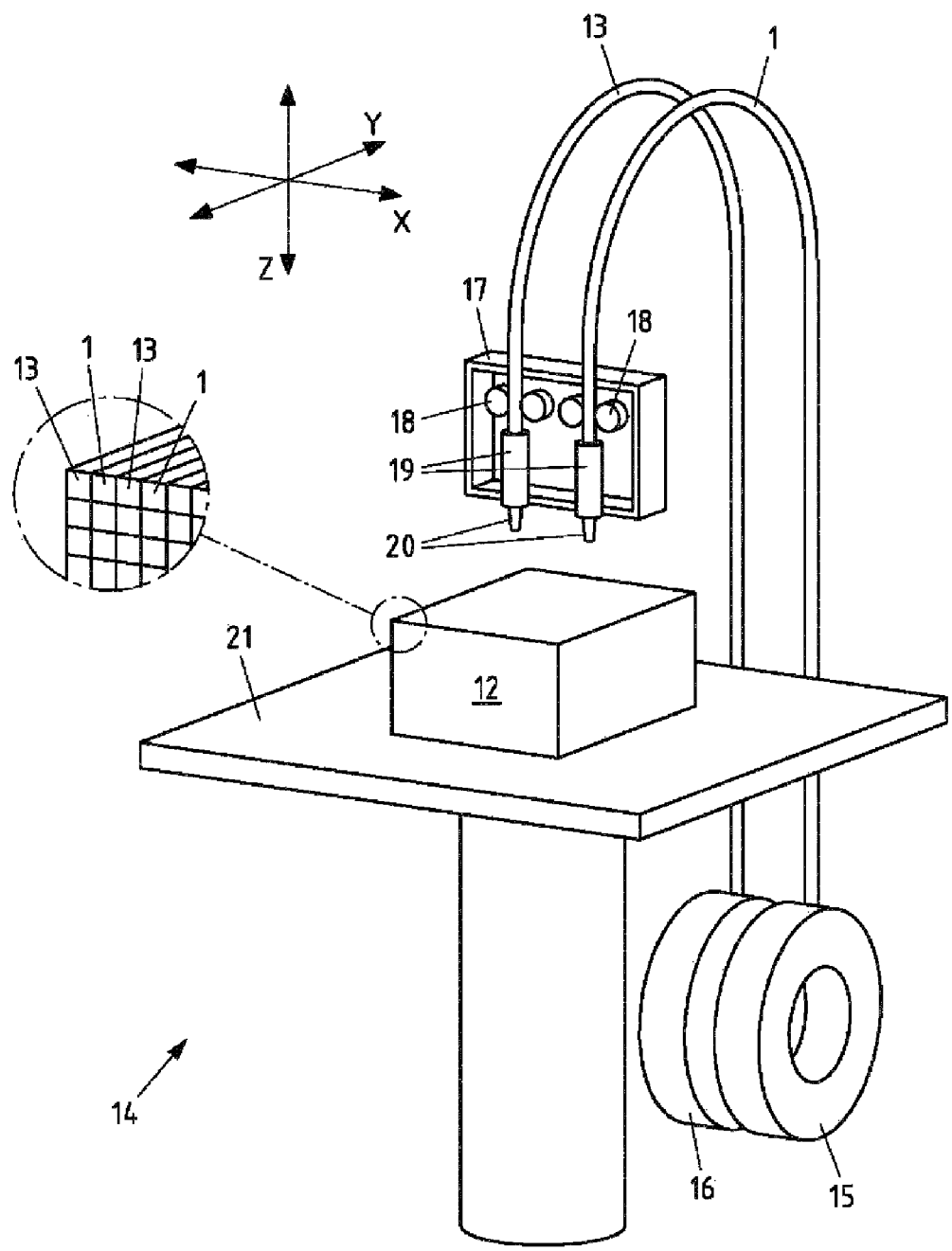
FIG. 2 is a schematic view of a method as contemplated herein for producing a washing agent product.

FIG. 2 is a schematic view of the method for producing washing agent products 12 from at least one filament 1, 13. In the 3D printer 14 shown and in this respect preferred, two different filaments 1, 13 can be used for printing. Additional filaments could be conceivable, however. The filaments 1, 13 are unrolled from the particular spool 15, 16 and guided into a print head 17, where they are held between drive wheels 18 in a frictional manner. By counterrotating the drive wheels 18, the corresponding filament 1, 13 is pressed through a heating device 19 and subsequently out of an extrusion nozzle 20. In the process, the pressed-out compound of the filament 1, 13 forms the washing agent product 12 in the desired shape and size. For this purpose, the print head 14 can be moved in the x, y and/or z direction, i.e. in all three spatial directions. Alternatively, the surface 21 on which the washing agent product 12 is printed can be adjusted in the x, y and/or z direction. The print head 17 does not then need to be adjustable in this direction or in these directions. What movements are carried out by the print head 17 and/or the surface 21 in the x, y and/or z direction, and which filament 1, 13 is used to print at what position of the print head 17 relative to the surface 21, is specified by the print template, which has all the corresponding information in a computer-readable form, in particular in a file. The file contains the data for the print template and/or the data for the washing agent product 12 in order to be able to print said product using a particular 3D printer 14. The data is stored as a file on a data carrier or storage medium as required. The file can be stored permanently in the 3D printer, such that the file can be repeatedly accessed via a user interface. The data can also be transmitted to the 3D printer 14 via radio, mobile network, W-LAN, Bluetooth, USB stick or in another suitable manner in order to print the desired washing agent product 12. In some circumstances, the file can be deleted again after the washing agent product 12 has been printed. Similarly to a printer for printing paper, for instance using ink or toner, a corresponding file or the corresponding information needs to be transmitted to the 3D printer 14 for each print job.

If required, the overall washing agent product 12 can be printed using just one filament 1, 13 or using both filaments 1, 13 together. It may be particularly preferable if particular portions of the washing agent product 12 are printed using one filament 1, 13 and other portions of the washing agent product 12 are printed using the other filament 1, 13 and, if required, still other portions of the washing agent product 12 are printed using a third filament, etc.

Figure 3:
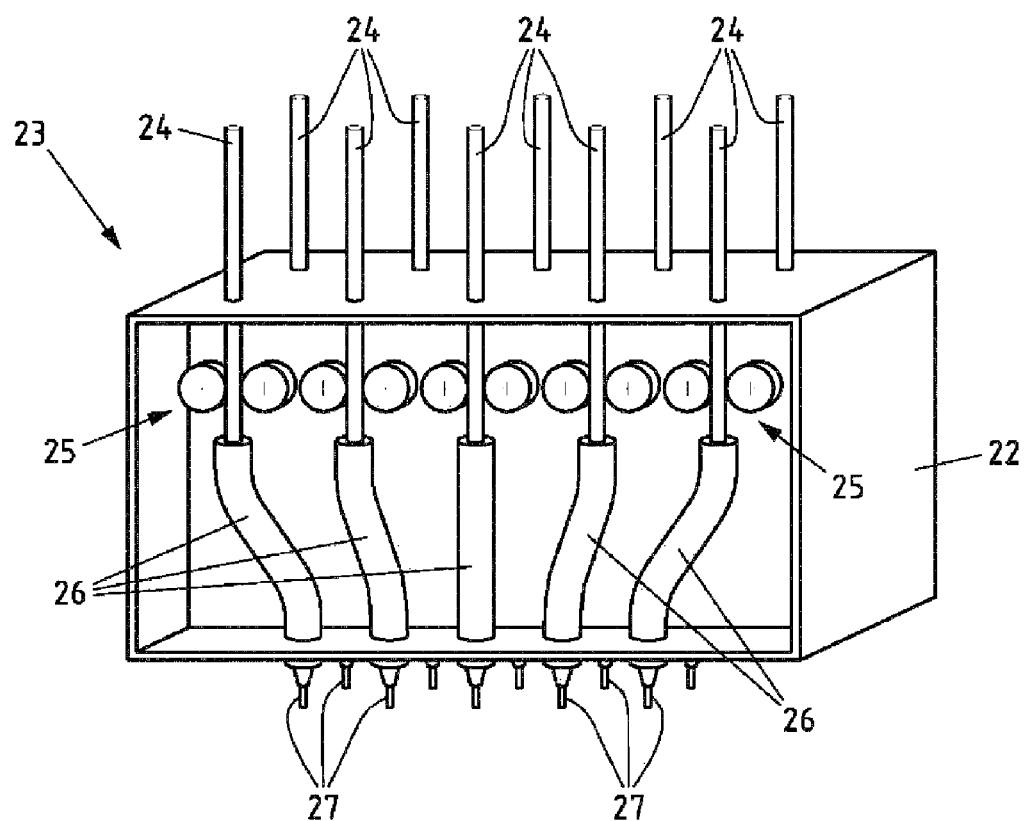
FIG. 3 is a schematic view of a print head for printing a washing agent product as contemplated herein.

FIG. 3 shows a print head 22 of a 3D printer 23 for printing very different washing agent products 12. Many filaments 24, which differ in terms of the composition thereof, are fed to the print head 22 in parallel. A drive mechanism 25, a heating device 26 and an extrusion nozzle 27 are associated with each filament 24. Depending on the print template, the corresponding filament 24 to be used for the printing is then selected for printing a particular washing agent product 12. Alternatively, a plurality of filaments 24 can also be used to print a washing agent product 12. When using corresponding print heads 22, the filament 24 to be printed does not need to be changed between the individual printing processes. It may merely be necessary to reload a filament 24 when the existing filament 24 is used up.

Figure 4:
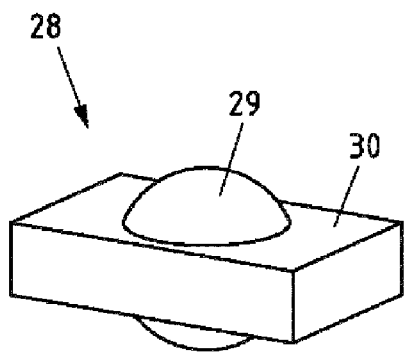
FIG. 4 is a perspective view of a first washing agent product as contemplated herein.

If required, a washing agent product 28 can be printed having two different portions 29, 30, which are arranged substantially next to one another. The washing agent product 28 shown in FIG. 4 in the form of a tablet has an inner spherical portion 29 and a roughly cuboid portion 30 that surrounds the inner spherical portion 29 at least in part. Both portions 29, 30 have been printed using different filaments having different compositions.

Figure 5:
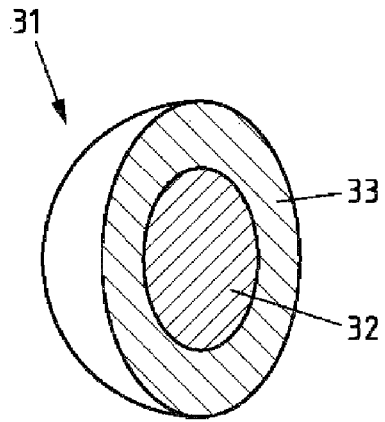
FIG. 5 is a sectional view of a second washing agent product as contemplated herein.

For the washing agent product 31 shown in FIG. 5 in the form of a tablet, an inner portion 32, printed from a filament of one composition, and an outer portion 33, printed from a filament of another composition, are likewise provided. In this case, however, the outer portion 33 completely encloses the inner portion 32. During washing, first the outer portion 33 needs to at least partially dissolve before the inner portion 32 can begin to dissolve. In this way, the washing agent components of the inner portion 32 are released after a time delay. If required, the outer portion 33 can be again completely enclosed by an outermost portion. The structure of the washing agent product 31 can thus resemble the layer structure of an onion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A filament for printing a washing or cleaning agent product, comprising a filament matrix and at least one washing or cleaning agent component incorporated in the filament matrix, wherein the filament matrix is formed at least substantially by at least one water-soluble plastic material that forms a continuous phase throughout the filament matrix and wherein the at least one washing or cleaning agent component is absorbed in the filament matrix as a homogeneously dispersed and continuous phase, wherein the at least one washing or cleaning agent component includes one or more cobuilders selected from the group of oxydisuccinates, derivatives of disuccinates, ethylenediamine disuccinate, acetylated hydroxycarboxylic acids or salts thereof, and wherein the one or more cobuilders are present in an amount of from about 3 to about 15 wt. %, based on the total weight of the at least one washing or cleaning agent.

2. The filament according to claim 1, wherein the filament has a diameter of between from about 0.1 millimeters (mm) and about 5 mm, and in that the filament has a length of at least about 5 meters (m).

3. The filament according to claim 1, wherein the at least one water-soluble plastic material is a thermoplastic plastic material comprising a polyvinyl alcohol.

4. A filament for printing a washing or cleaning agent product, comprising a filament matrix and at least one washing or cleaning agent component incorporated in the filament matrix, wherein the filament matrix is formed at least substantially by at least one water-soluble plastic material that forms a continuous phase throughout the filament matrix and wherein the at least one washing or cleaning agent component is absorbed in the filament matrix as a homogeneously dispersed and continuous phase, wherein the at least one washing or cleaning agent component is one or more components selected from the group of surfactants, alkalis, builders, graying inhibitors, optical brighteners, hueing dyes, enzymes, bleaching agents, photobleaching agents, photocatalysts, soil release polymers, fillers, plasticizers, fragrances, anti-odor substances, zinc ricinoleates, dyes, nourishing agents, acids, starches, isomalt, sugar, cellulose, cellulose derivatives, carboxymethyl cellulose, polyetherimide, silicone derivatives, or polymethylimines, and wherein the at least one washing or cleaning agent component includes one or more of the builders including amorphous sodium silicate(s) having an $Na_2O$:$SiO_2$ modulus of from about 1:2 to about 1:3.3.

5. A method for producing a filament comprising:
heating at least one water-soluble plastic material and at least one washing or cleaning agent component, in an extruder;
discharging from at least one nozzle of the extruder the at least one water-soluble plastic material and the at least one washing or cleaning agent component together in one strand as an extrudate; and
cooling the extrudate after discharging from the at least one nozzle to produce the filament, wherein the filament comprises a filament matrix and the at least one washing or cleaning agent component incorporated in the filament matrix, wherein the filament matrix is formed at least substantially by the at least one water-soluble plastic material that forms a continuous phase throughout the filament matrix and wherein the at least one washing or cleaning agent component is absorbed in the filament matrix as a homogeneously dispersed and continuous phase, and wherein the at least one washing or cleaning agent component includes one or more cobuilders selected from the group of oxydisuccinates, derivatives of disuccinates, ethylenediamine disuccinate, acetylated hydroxycarboxylic acids or salts thereof, and wherein the one or more cobuilders are present in an amount of from about 3 to about 15 wt. %, based on the total weight of the at least one washing or cleaning agent.

6. The method for producing a filament according to claim 5, wherein cooling the extrudate comprises cooling the extrudate using at least one gas.

7. The method of claim 5 further comprising: printing a washing or cleaning agent product with the filament in a 3D printer.

8. The method according to claim 7, wherein printing the washing or cleaning agent product comprises printing the washing or cleaning agent product in the form of a tablet, a strip, a film, a honeycomb structure or a sphere.

9. The method according to claim 7, wherein printing the washing or cleaning agent product comprises printing the washing or cleaning agent product in particular different portions from different filaments and wherein, at least one inner portion of the washing or cleaning agent product is printed from at least one filament and at least one outer portion that surrounds the inner portion is printed from at least one other filament.

10. The method according to claim 7, wherein printing the washing or cleaning agent product comprises printing the washing or cleaning agent product with a print template using the filament, wherein the print template comprises information relating to the gradual application of at least one material to the three-dimensional washing or cleaning agent product.

11. The method according to claim 9, wherein printing the washing or cleaning agent product comprises printing the washing or cleaning agent product wherein the outer portion completely surrounds the inner portion.

12. The filament according to claim 3, wherein the polyvinyl alcohol is partially saponified having a proportion of polyvinyl acetate present in an amount of less than about 30 wt. % of the polyvinyl alcohol.

13. The filament according to claim 12, wherein the polyvinyl alcohol is cold-water-soluble having the proportion of polyvinyl acetate present in an amount of up to about 12 wt. % based on the weight of the polyvinyl alcohol.

14. The filament according to claim 12, wherein the polyvinyl alcohol is hot-water solubility having the proportion of polyvinyl acetate present in an amount of up to about 1 wt. % based on the weight of the polyvinyl alcohol.

15. The filament according to claim 4, wherein the at least one washing or cleaning agent component includes one or more anionic surfactants selected from the group alkylbenzene sulfonates, alkylether sulfates or soaps, wherein a total amount of the one or more anionic surfactants are present in an amount of from about 5 to about 50 wt. % based on the total weight of the at least one washing or cleaning agent.

* * * * *